Sept. 25, 1945.  W. F. BARTOE ET AL  2,385,486

PRODUCTION OF THERMOPLASTIC SHEETS OF NONUNIFORM THICKNESS

Filed March 28, 1942

INVENTORS
Willard F. Bartoe &
Walter R. Speck
BY T. Wallace Quinn
ATTORNEY.

WITNESS:

Patented Sept. 25, 1945

2,385,486

UNITED STATES PATENT OFFICE 2,385,486

PRODUCTION OF THERMOPLASTIC SHEETS OF NONUNIFORM THICKNESS

Willard F. Bartoe, Hulmeville, and Walter R. Speck, Langhorne, Pa., assignors to Röhm & Haas Company, Philadelphia, Pa., a corporation of Delaware Application March 28, 1942, Serial No. 436,636

4 Claims. (Cl. 18—58)

This invention relates to the production of thermoplastic sheets of non-uniform thickness. It particularly relates to the casting of relatively large thermoplastic sheets or panels which are thicker at or near the center than at or near the edges.

Small curved objects, such as ornaments, art objects, goggle lenses, etc., may be produced conveniently by well-established methods of molding, notably by compression and injection molding. Larger objects such as those measuring several square feet in area cannot be produced conveniently by such technique. It is customary to produce such items by shaping sheets of thermoplastic materials. In such operation the sheets, which have been precast or pre-formed are heated until they become ductile whereupon they are shaped usually by application of pressure. Two convenient methods for carrying out this shaping operation are described in United States Patents Nos. 2,123,552 and 2,142,445, issued July 28, 1938, and January 3, 1939, respectively. Another method, which uses gaseous pressure instead of liquid pressure as in the former cases, is described in co-pending application, Serial No. 436,632, now United States Patent No. 2,367,642, filed March 28, 1942. In all such processes, the sheet is drawn to the desired shape and then cooled while being held in that particular shape. In the production of curved shapes or domes, some sections of the sheet are stretched or drawn more than others and as a result the walls of the domes are of uneven or non-uniform thickness. This lack of uniform thickness results in a loss of strength at the thinner portions, and in the case of transparent domes it also results in a variation in the optical properties of the dome.

For example, in the production of such objects for aircraft, as airplane turrets, commanders' domes, cockpit covers, bomber noses, transparent enclosures or windows for bombardiers' stations, etc., it is highly desirable that the thermoplastic structural material be uniformly strong and free of optical distortion. This may be accomplished by having the walls of the domes, etc., of uniform thickness. Unfortunately, however, the drawing of uniformly thick, flat sheets to form these curved shapes results in non-uniform sections as described above. For instance, if a flat circular sheet of uniform thickness is drawn into a transparent bomber-nose having a shape like the ordinary derby hat, the center of the original sheet is stretched much more than the portions nearer the perimeter. As a result, the sides of the dome are thicker than the top of the dome and, furthermore, the sides gradually taper in thickness from the rim to the top. Consequently the top is much weaker than the sides and, depending on conditions, may be too weak to permit satisfactory use on aircraft.

Our invention provides a means of overcoming this difficulty by the production of thermoplastic sheets which are thicker in the center than at the edges. For the sake of convenience we choose to refer to such non-uniform sheets as "loaded" or "thick-centered" sheets. Such sheets may be cast in a cell which has sides capable of bulging under the weight of the cast thermoplastic material when in the vertical position. In general, a convenient cell may be made from two parallel glass plates which are properly spaced and clamped at the edges. The walls of the cell may be made of polished metal, plastic or any similar material with the proper strength factors and which will not mar or adhere to the surface of the finished sheet. More thermoplastic material is added to the cell than its normal capacity when the walls are parallel. Under the weight of the cast material, the walls of the cell bulge and the greatest bulge or deviation occurs at the center of the cell.

Although we prefer to employ the polymeric derivatives of acrylic acid and methacrylic acid, our process is not limited to these materials. All thermoplastic materials, which are capable of being cast into rigid sheets which adhere to the walls of the cell during polymerization and which, when hard, may be conveniently separated from the cell, may be employed. Suitable materials include the following, which may be used alone or in various combinations derivatives of acrylic and methacrylic acids, styrene, acrylamide, chlorinated and otherwise substituted acrylic and methacrylic derivatives, vinyl chloride, vinyl acetate, etc.

The cell and its contents are heated until polymerization has been completed. Thereafter, they are cooled and the finished sheet is removed from the cell.

Depending upon the ultimate use to which it is to be put, the sheet may be tinted, or colored, or opacified. Soluble dyes may be used for tinting and coloring and pigments may be used as opacifiers.

Softening agents, coloring matter, catalysts, polymerization regulators or other modifying substances may be employed when desired.

The drawing illustrates the construction of a cell as used in practicing our invention, and the following is a description of our method of forming loaded sheets.

Figure 1:
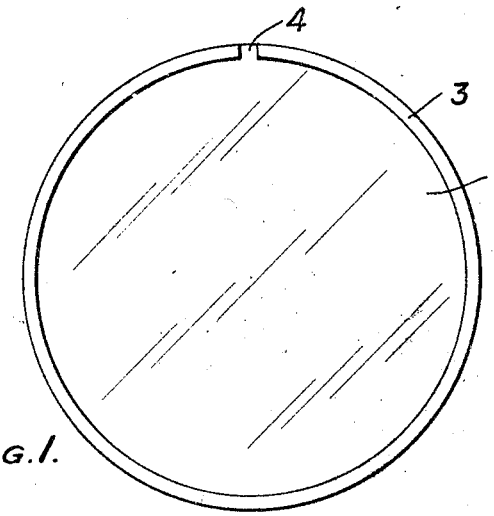
Fig. 1 is a view of an empty circular cell with one side-wall removed.
Figure 2:
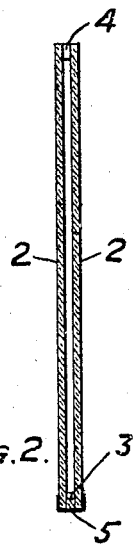
Fig. 2 is a cross-section of a complete cell.

Referring to the figures, in which like reference characters designate the same parts, two glass sheets 2 are held in position by spacers 3. The edges of the cell are sealed with binding material 5. 4 represents an opening through which polymerizable material A is poured to level 6, after which opening 4 is closed and sealed.

Figure 7:
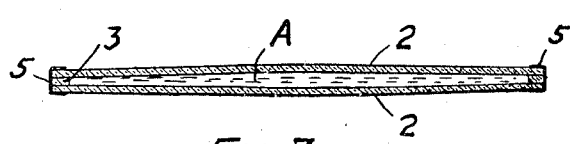
Fig. 7 shows the completely filled and sealed cell in the horizontal position, in which position it remains bulged.
Figure 6:
Fig. 6 is a cross-section of a cell in vertical position which has been entirely filled and sealed.

Referring to the drawing, the process of casting loaded sheets of polymeric material, for example, may be described as follows: While the cell is held in a vertical position, it is filled with the liquid monomer in which the necessary modifying agents have been dissolved. Under these conditions, due to the weight of the liquid, the walls of the cell will bulge as shown in Fig. 6. It is preferred to add to the cell a volume of liquid which is between about 20% and about 80% greater than the volume of the empty cell when its walls are parallel. The assembly is then heated at the boiling point of the monomer in a suitable oven or bath for a period of about 2 to about 30 minutes, during which the dissolved gases are expelled but polymerization is not permitted to proceed to a great extent. At this point, the cell is sealed and is lowered to the horizontal position, as shown in Fig. 7. While the cell is held in this position, the temperature is so adjusted as to cause complete polymerization to take place. When polymerization is complete, the cell is allowed to cool to approximately room temperature whereupon the cell walls are parted and the loaded sheet of polymer is removed.

Although the drawing shows circular cells, it is apparent that the cells may equally well be shaped otherwise. For example, a cell may be formed of square walls.

As to the spacers, which are employed in the construction of the cell, they can be constructed of thermoplastic material in which case they are not removed during the polymerization; or they may be of rigid material and be removed at some intermediate stage of the polymerization.

A more thorough understanding of this invention may be had from the following examples.

*Example 1*

Figure 3:
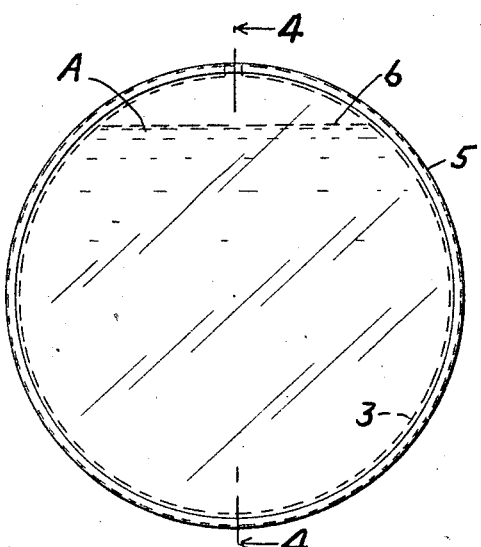
Fig. 3 shows a cell containing a sheet-forming material A to a level such as is normally reached in the production of sheets of uniform thickness.
Figures 4, 5:
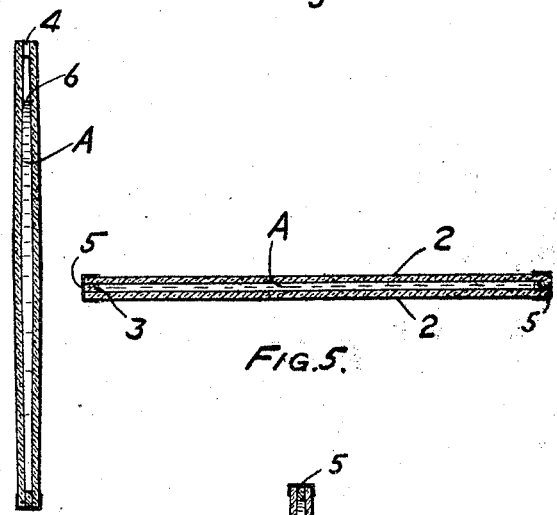
Fig. 4 is a cross-section along line 4—4 of Fig. 3 and shows the bulge which occurs in the cell due to the weight of the contents when the cell is in the vertical position.
Fig. 5 is a cross-section of the same cell, as shown in Fig. 3, which has been sealed and placed in the horizontal position.

Seven pounds of a mixture of methyl methacrylate and ethyl acrylate, containing 0.04% benzoyl peroxide as a polymerization catalyst and 0.5% of a release agent, was introduced into a cell 35 inches in diameter, similar to that shown in Fig. 3. The walls bulged slightly as shown in Fig. 4. The cell and contents were heated to the boiling point of the contents and boiling was continued until all occluded gases had been released. The cell was then cooled to 70° C., closed, sealed, and gradually lowered to the horizontal position, in which position the walls were essentially parallel. Heating was continued at 70° to 100° C. for several hours during which polymerization became complete. After being cooled to room temperature, the sheet was removed from the cell and was found to be slightly thinner in the center than at the edges.

*Example 2*

A "loaded" sheet was prepared of the same mixture and in the same manner as recorded in Example 1, except that eleven pounds of monomeric mixture was introduced into the cell. Under the weight of the liquid the walls of the cell bulged as shown in Fig. 6. The cell and contents were heated as in Example 1 to drive off all occluded gases and thereafter the cell was closed, sealed, and lowered to the horizontal position where it assumed an appearance as shown in Fig. 7. Heating was continued at about 70° C. to about 100° C. for several hours during which polymerization was completed. After being cooled to room temperature the sheet was removed from the cell and was found to be definitely thicker at the center than at the edges.

The variation in thickness of the sheets, produced in accordance with Examples 1 and 2 respectively, was measured at equidistant points across the middle of each sheet. The difference in thickness is here tabulated:

|  | Edge | Pt. 1 | Pt. 2 | Pt. 3 | Pt. 4 | Edge |
|---|---|---|---|---|---|---|
| Thickness of 7 lb. sheet | Inches .23 | Inches .22 | Inches .21 | Inches .21 | Inches .22 | Inches .23 |
| Thickness of 11 lb. sheet | .24 | .29 | .33 | .33 | .29 | .24 |

*Examples 3 and 4*

Each of the two sheets resulting from Examples 1 and 2 was stretched into a hemispherical dome by the process described in copending application, Serial No. 436,632, now United States Patent No. 2,367,642, filed simultaneously with this application. The operation consisted of heating each sheet until it had become ductile and then securely clamping the sheet to the rim of a cylindrical chamber, after which the pressure within the chamber was reduced by means of a suction pump whereupon the sheet was forced, by the differential gas pressure on its two sides, to assume a curved shape. The pressure differential was adjusted until the sheet had assumed the shape of a hemisphere, after which the pressure was so regulated as to hold the sheet in the hemispherical shape while the latter cooled to a temperature at which it resisted further deformation.

It was noted that the dome, made from the 11 lb. sheet, was substantially uniform in thickness throughout while that made from the 7 lb. sheet was definitely thinner and weaker at the crown than at the sides.

The following data will serve to show the great advantage in uniformity and strength possessed by the dome made from the "loaded" sheet over that dome made from the normal or seven-pound sheet. The thickness of each dome was measured at regular intervals along a line drawn across the dome from the center of curvature. Also the strength of the domes was measured by placing different weights on the domes and noting the deflection or amount of yield of the dome under the weight. The results of these tests were as follows:

*Thickness in inches—Cross-section of the domes*

|  | Edge | Pt. 1 | Pt. 2 | Pt. 3 | Pt. 4 | Edge |
|---|---|---|---|---|---|---|
| 7-lb. dome | .15 | .10 | .07 | .07 | .10 | .14 |
| 11-lb. dome | .16 | .16 | .155 | .155 | .16 | .16 |

*Strength of domes (inches of deflection under weight)*

| Weight | 1,000 g. | 2,000 g. | 3,000 g. | 4,000 g. | 5,000 g. | 6,000 g. |
|---|---|---|---|---|---|---|
| 7-lb. dome | .01 | .02 | .03 | .04 | .05 | .06 |
| 11-lb. dome |  |  | .01 |  |  | .02 |

The advantage of producing non-uniform or "loaded" or thick-centered sheets for utilization in the production of uniformly thick and uniformly strong domes is thus readily apparent.

We claim:

1. The process of manufacturing thick-centered sheets of organic, polymerized, thermoplastic material which comprises forming a cell of two parallel, flat, resilient sheets of material held in spaced relationship and sealed along their perimeters and which have such strength factors that they are capable of bulging under the weight of the contents of the cell when in the vertical position, introducing into said cell while in the vertical position a fluid, polymerizable material of a density sufficient to cause said sheets to bulge and in an amount which is from about 20% to about 80% greater in volume than the volume of the cell when empty, thereby causing the walls of said cell to bulge, heating the polymerizable liquid to drive off extraneous gases, completely sealing said cell, placing said sealed cell in a horizontal position, heating the polymerizable material to effect complete polymerization thereof, cooling said material, and removing the thick-centered sheet of polymerized material from the cell.

2. The process of claim 1 in which the fluid, polymerizable material is a mixture of acrylic and methacrylic esters.

3. The process of claim 1 in which the fluid, polymerizable material is styrene.

4. The process of claim 1 in which the fluid, polymerizable material is a mixture of methyl methacrylate and ethyl acrylate.

WILLARD F. BARTOE.
WALTER R. SPECK.